(12) United States Patent
Lin et al.

(10) Patent No.: US 11,519,165 B2
(45) Date of Patent: Dec. 6, 2022

(54) FOUNDATION TO FRAME CONNECTOR

(71) Applicant: Simpson Strong-Tie Company Inc., Pleasanton, CA (US)

(72) Inventors: Jin-Jie Lin, Livemore, CA (US); Timothy M. Stauffer, Pleasant Hill, CA (US); Scott James Fischer, San Jose, CA (US); Emmet J. Mielbrecht, Danville, CA (US)

(73) Assignee: Simpson Strong-Tie Company Inc., Pleasanton, CA (US)

( * ) Notice: Subject to any disclaimer, the term of this patent is extended or adjusted under 35 U.S.C. 154(b) by 0 days.

(21) Appl. No.: 16/415,935

(22) Filed: May 17, 2019

(65) Prior Publication Data

US 2019/0352898 A1 Nov. 21, 2019

Related U.S. Application Data

(60) Provisional application No. 62/674,248, filed on May 21, 2018.

(51) Int. Cl.
| | | |
|---|---|---|
| *E02D 27/00* | (2006.01) | |
| *E04B 1/41* | (2006.01) | |
| *E04G 23/02* | (2006.01) | |
| *E04B 2/70* | (2006.01) | |
| *E04B 1/38* | (2006.01) | |

(52) U.S. Cl.
CPC ............... *E04B 1/40* (2013.01); *E04G 23/02* (2013.01); *E04B 2/70* (2013.01); *E04B 2001/405* (2013.01)

(58) Field of Classification Search
CPC ........ E04B 1/40; E04B 2001/405; E04B 2/70; E04G 23/02; E04G 23/0229
USPC ...................................................... 52/293.3
See application file for complete search history.

(56) References Cited

U.S. PATENT DOCUMENTS

| | | |
|---|---|---|
| 379,839 A | 3/1888 | White |
| 589,079 A | 8/1897 | Glazier |
| 887,217 A | 5/1908 | Oliphant |

(Continued)

FOREIGN PATENT DOCUMENTS

| | | |
|---|---|---|
| DE | 2639552 | 3/1978 |
| DE | 2643365 | 3/1978 |

(Continued)

OTHER PUBLICATIONS

"Earthquake-Resistant Construction Connectors", Catalog, Copyright 1996 #CEQ96, Simpson Strong-Tie Company, Inc., Pleasanton, CA.

(Continued)

*Primary Examiner* — Basil S Katcheves
(74) *Attorney, Agent, or Firm* — Charles R Cypher; James R Cypher

(57) ABSTRACT

A foundation connector is formed with a foundation attachment section and a frame attachment section connected by a transition section at the central area of the foundation connector. The frame attachment section is attached to a frame member with fasteners and the foundation attachment section is attached to the foundation with anchors. The foundation attachment section has a curved foundation attachment base. The frame attachment section has a curved frame attachment base. A transition section is provided between the foundation attachment section and the frame attachment section that is curved.

16 Claims, 11 Drawing Sheets

(56) References Cited

U.S. PATENT DOCUMENTS

| | | |
|---|---|---|
| 953,060 A | 3/1910 | Ross |
| 957,531 A | 5/1910 | Winslow |
| 1,741,776 A | 12/1929 | Isaacson |
| 1,848,422 A | 3/1932 | Isaacson |
| 1,909,984 A | 5/1933 | Prindle |
| 1,971,200 A | 8/1934 | Proctor |
| 2,165,336 A | 7/1939 | Brogden |
| 2,260,105 A | 10/1941 | Hasenburger et al. |
| 2,463,215 A | 3/1949 | Strachan |
| 2,990,920 A | 3/1949 | Strachan |
| 2,686,700 A | 8/1954 | McCarran |
| 2,903,879 A | 9/1959 | Williams |
| 2,920,477 A | 1/1960 | Shaw |
| 3,199,642 A | 8/1965 | Anderson |
| 3,205,981 A | 9/1965 | Lilly |
| 3,250,546 A | 5/1966 | Allison |
| 3,420,337 A | 1/1969 | Magee |
| 3,479,071 A | 11/1969 | Downing |
| 3,750,360 A | 8/1973 | Kingston |
| 3,842,554 A | 10/1974 | Swick |
| 3,889,441 A | 6/1975 | Fortine |
| 3,939,618 A | 2/1976 | Murphy |
| 3,998,026 A | 12/1976 | Allen |
| 4,030,378 A | 6/1977 | Kroesser |
| 4,096,677 A | 6/1978 | Gilb |
| 4,202,149 A | 5/1980 | Betrue, Sr. |
| 4,404,781 A | 9/1983 | Gilb |
| 4,413,456 A | 11/1983 | Gilb |
| 4,530,194 A | 7/1985 | Linton et al. |
| 4,570,403 A | 2/1986 | Danemiller |
| 4,598,900 A | 7/1986 | Yamamoto et al. |
| 4,611,793 A | 9/1986 | Nishiyama |
| 4,630,804 A | 12/1986 | Fesko |
| 4,637,595 A | 1/1987 | Mishima et al. |
| 4,643,406 A | 2/1987 | Mounier-Poulat et al. |
| 4,684,110 A | 8/1987 | Sale |
| 4,739,598 A | 4/1988 | Jensen et al. |
| 4,796,403 A | 1/1989 | Fulton et al. |
| 4,895,350 A * | 1/1990 | Schoof ............... B60G 11/113 267/52 |
| 4,924,648 A | 5/1990 | Gilb |
| 4,977,983 A | 12/1990 | Garrido et al. |
| 5,060,810 A * | 10/1991 | Jones ................... A47F 7/0035 211/4 |
| 5,072,570 A | 12/1991 | Johnson |
| 5,150,553 A | 9/1992 | Commins |
| 5,160,211 A | 11/1992 | Gilb |
| 5,249,404 A | 10/1993 | Leek |
| 5,274,981 A | 1/1994 | Commins |
| 5,390,455 A | 2/1995 | Antolini |
| 5,419,649 A | 5/1995 | Gilb |
| 5,469,938 A | 11/1995 | Biewald et al. |
| 5,513,476 A | 5/1996 | Jones |
| 5,520,264 A | 5/1996 | Korhonen |
| 5,595,031 A | 1/1997 | Commins |
| 5,611,179 A * | 3/1997 | Leek ...................... E04B 1/003 403/13 |
| 5,732,519 A * | 3/1998 | Leek ..................... E04B 1/0007 52/274 |
| 5,813,182 A | 9/1998 | Commins |
| D436,311 S * | 1/2001 | Edvardsson ................... D8/382 |
| 6,196,356 B1 | 3/2001 | Sneed |
| 6,481,538 B2 | 11/2002 | Blackaby et al. |
| 6,830,133 B2 | 12/2004 | Sneed |
| 7,192,216 B2 | 3/2007 | Casale |
| 7,367,168 B2 | 5/2008 | Lin |
| 8,356,449 B2 | 1/2013 | Lin |
| 8,555,592 B2 | 10/2013 | Daudet et al. |
| 10,285,514 B2 * | 5/2019 | Iellimo ................. A47F 5/0068 |
| 10,865,558 B2 | 12/2020 | Vilasineekul et al. |
| 2008/0271405 A1 | 11/2008 | Masters |

FOREIGN PATENT DOCUMENTS

| | | | |
|---|---|---|---|
| GB | 791480 A * | 3/1958 | .......... D01H 13/302 |
| GB | 2 286 337 | 8/1995 | |

OTHER PUBLICATIONS

"Earthquake Retrofit Products for Wood Frame Buildings", Brochure, 4 pgs., 1994, Harlen Metal Products, Inc.

* cited by examiner

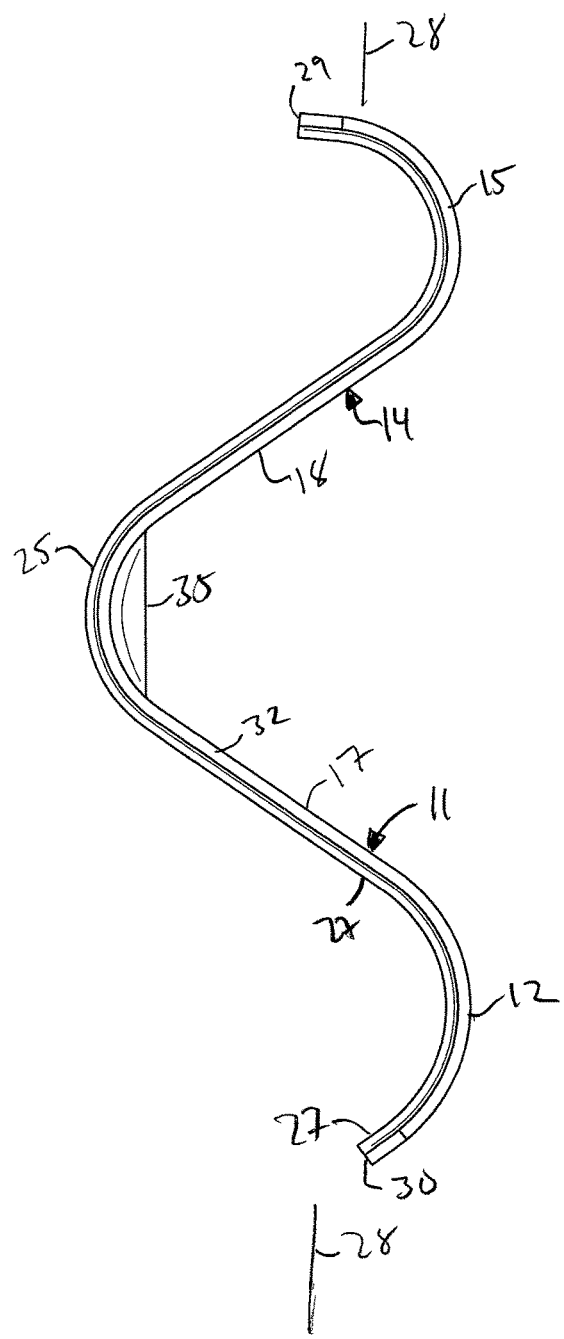
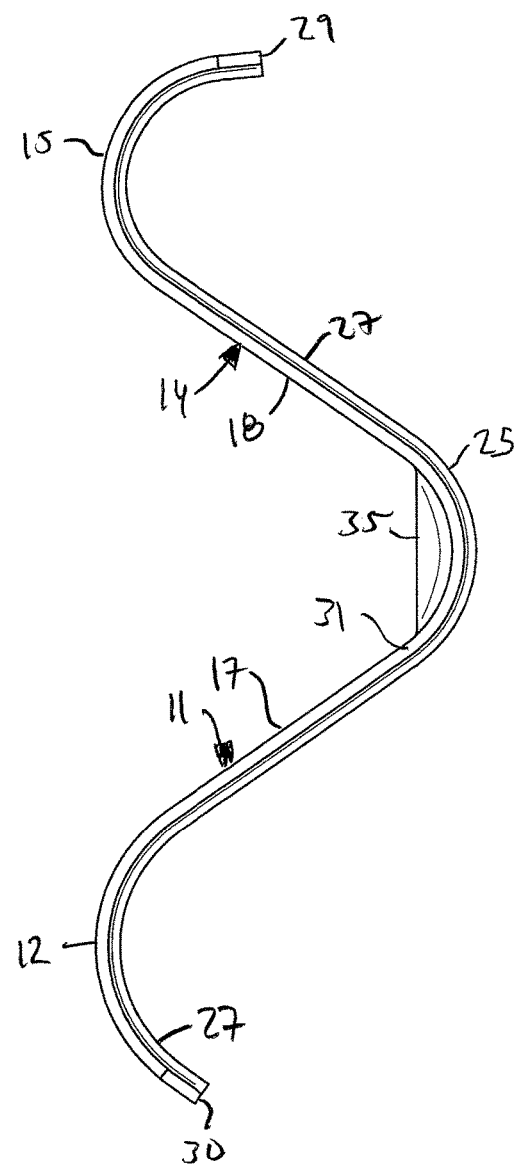
Fig. 5                    Fig. 6

FOUNDATION TO FRAME CONNECTOR

BACKGROUND OF THE INVENTION

This invention relates to a connection for attaching a frame member to a foundation, and it has particular use where a mudsill that is part of an existing wall needs to be anchored to the foundation for that wall. The connection is made with a foundation plate and fasteners.

Strong lateral forces, such as those caused by earthquakes or hurricanes, can lift a building off of its foundation. As such it has become standard practice to anchor building to their foundations. In most modern buildings the anchors that connect the building to the foundation are installed during the pouring of the concrete. In comparison, many older buildings were built before it was recognized that the building needed to be anchored to the foundation and as such they lack all such connections.

The current invention provides a convenient and inexpensive mechanism for anchoring an already-constructed building to its foundation, otherwise known as retrofit work. Retrofitting an anchoring connection between the building and its foundation typically imposes two major difficulties on the builder. The builder must add the connection to an existing structure and they must often work in a cramped space between the lower level of the building and its foundation. The ease with which this connection can be formed despite these difficulties is important to a product's economic success, and, in fact, the ease of installation of the connection may be determinative as to whether the retrofit work will be done at all. This is especially true for crawl space foundations often found in houses in the west where the first level of the building may be no more than a few feet above the ground.

Because the existing building already sits on top of the foundation wall, typical retrofit anchors attach to the sides of both the foundation wall and the building members on top of the foundation wall. Ideally, the fasteners and anchors that are used to attach the connector to the foundation and the framing members of the wall are driven horizontally or near horizontally so there is access for the driving tools. Furthermore, the connector should be able to accommodate differences in the dimensions and shapes of the framing members and the foundation. In some houses, the framing members will overhang the foundation wall, while in others the framing members will be set back from the edge of the foundation wall.

There are a number of foundation connectors that have been patented that try to address the needs identified above. U.S. Pat. No. 5,513,476 teaches a two-piece adjustable connector that attaches to the side of a framing member resting on the foundation and the side of the foundation. This connector allowed for variations in the dimensions and positioning of the frame member and the foundation by having a pair of plates that could be positioned with respect to each other in a variety of positions. The top plate of the pair of plates is connected to the frame member and the bottom plate of the pair is connected to the foundation. When the plates have been positioned with respect to the members to which they will attach, the plates are then connected to each other by means of fasteners placed in aligned pre-punched openings in the plates.

U.S. Pat. No. 5,732,519, invented by William F. Leek and issued in 1998 taught a one-piece, foundation connector that also attaches to the sides of the framing members and the foundation. The connector allowed for variation in the dimensions and positioning of the frame and the foundation due to its unique shape.

The present invention provides an improved one-piece foundation-to-frame connector.

SUMMARY OF THE INVENTION

The present invention provides a connection that is easily and economically formed while also being strong. The connection according to the present invention is between a framing member and the foundation which supports the framing member. The members are connected by a foundation connector and fasteners or anchors.

The present invention provides for anchoring the foundation connector with an anchor that is inserted into the side wall of the foundation.

The present invention also provides for anchoring the foundation connector with fasteners that are driven into the side wall or walls of the framing member or members supported by the foundation.

The present invention uses standard fasteners and anchors for connecting the foundation connector to the framing member and the foundation.

The foundation connector of the present invention is formed with a foundation attachment section and a frame attachment section connected by a transition section at the central area of the foundation connector. The foundation attachment section has a curved foundation attachment base. The frame attachment section has a curved frame attachment base. The transition section is also curved. The foundation attachment base and the frame attachment base are concave curved portions, and the transition section is a convex curved portion.

The foundation attachment base of the present invention is constructed so that the openings in the foundation attachment base are formed to permit insertion of the anchors at a plurality of angles relative to the foundation connector. Similarly, the frame attachment base is constructed so that the openings in the frame attachment base are formed to permit of insertion of the fasteners at a plurality of angles relative to the foundation connector.

The openings in the foundation attachment base and the frame attachment base are preferably elongated and formed on the curved foundation attachment base and the curved frame attachment base. The openings in the foundation attachment base preferably extend into the straight portion of the foundation attachment section. The openings preferably have elongated, scalloped side walls. The edges of the openings are also preferably formed with upturned lips to strengthen the material of the foundation connector around the openings.

To strengthen the connector, the foundation connector is formed with embossments that run along the lateral axis between the front and back edges of the foundation connector. Preferably the embossments located away from the side edges of the foundation connector are provided as side-by-side parallel pairs. The embossments are preferably formed with flat top sections and generally flat angled sides The transition section at the central portion of the connector is preferably strengthened with elongated, oval-shaped indentations between the embossments.

BRIEF DESCRIPTION OF THE DRAWINGS

FIG. 5 is a right side view of the foundation connector of the present invention.

FIG. 6 is a left side view of the foundation connector of the present invention.

DETAILED DESCRIPTION OF THE INVENTION

Figure 1:
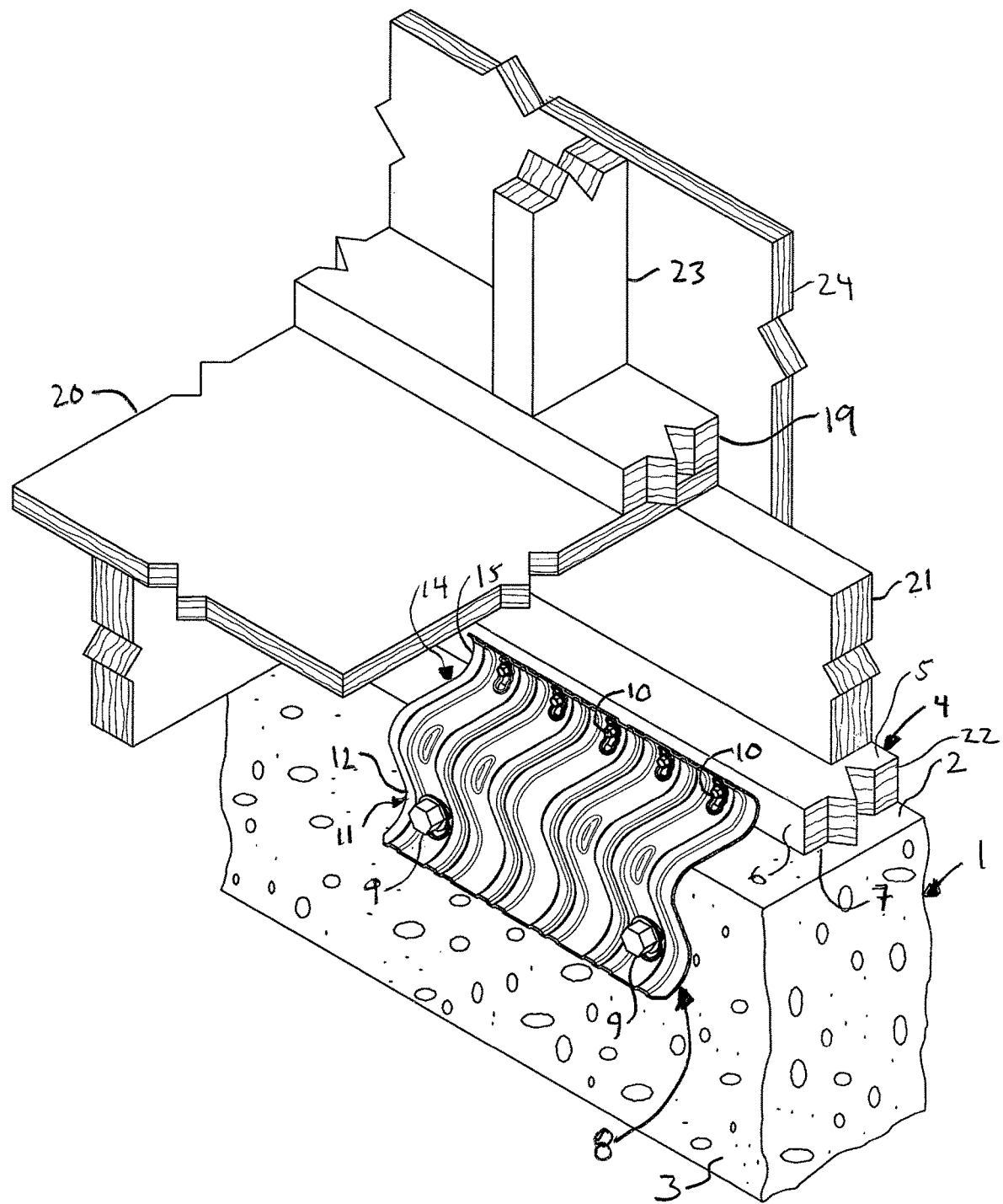
FIG. 1 is a perspective view of the connection of the present invention.
Figure 2:
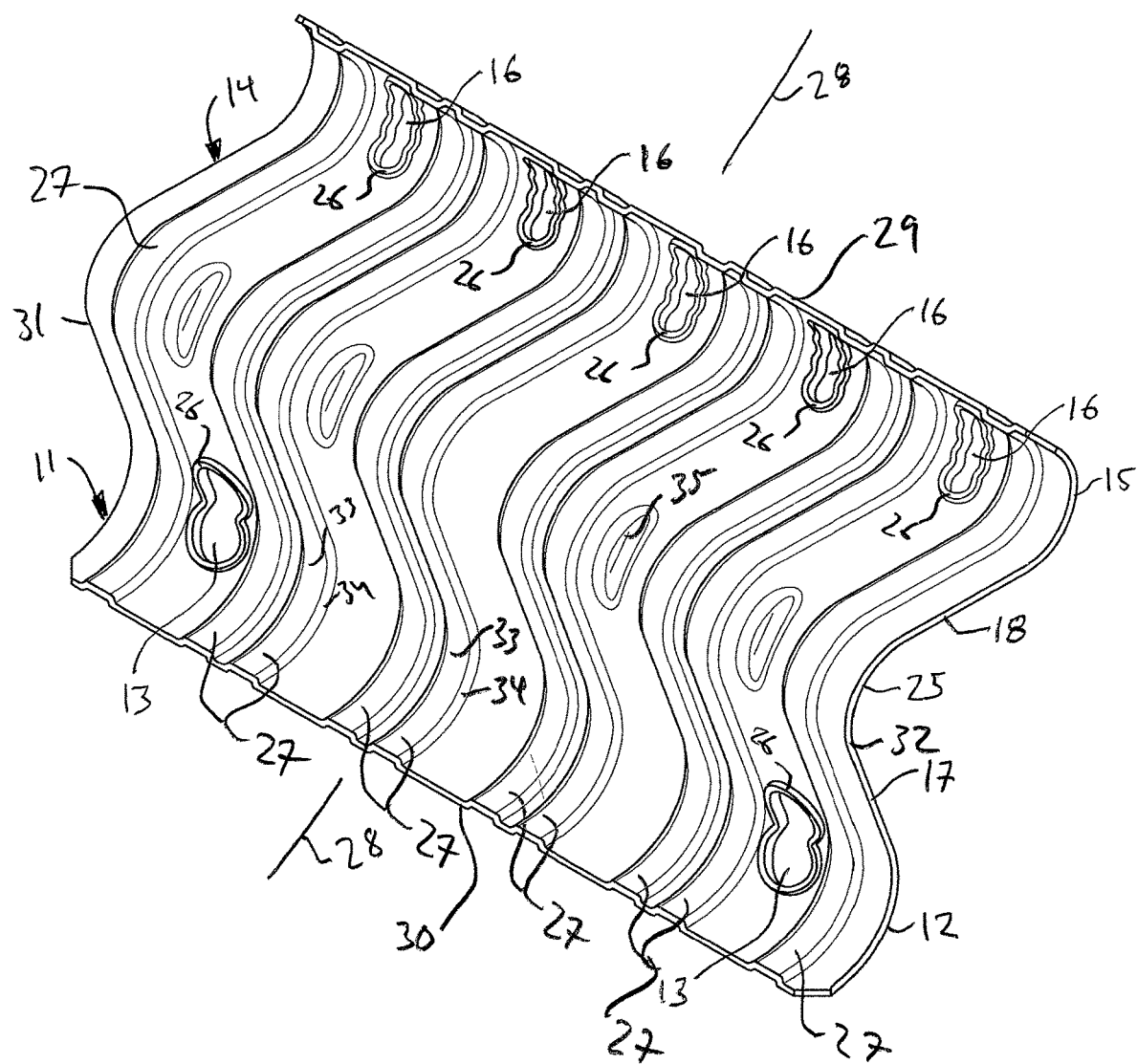
FIG. 2 is a perspective view of the foundation connector of the present invention.
Figure 3:
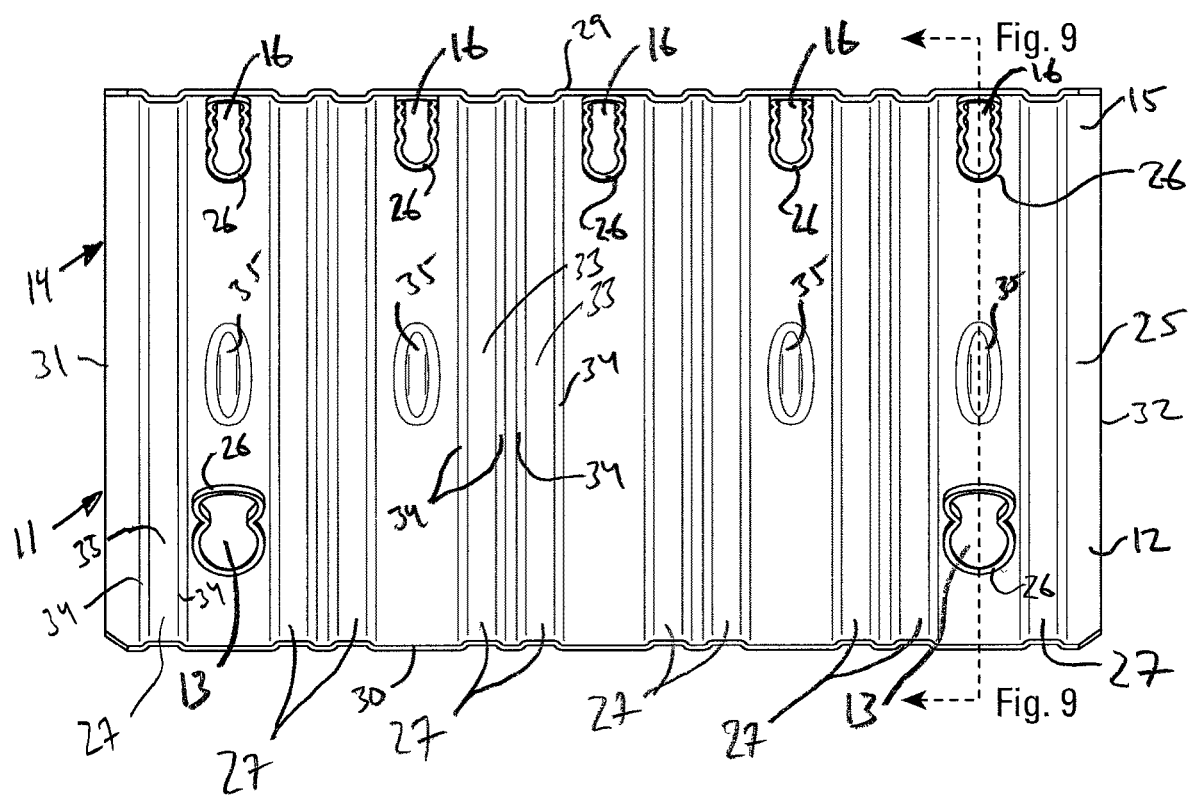
FIG. 3 is a top view of the foundation connector of the present invention.
Figure 4:
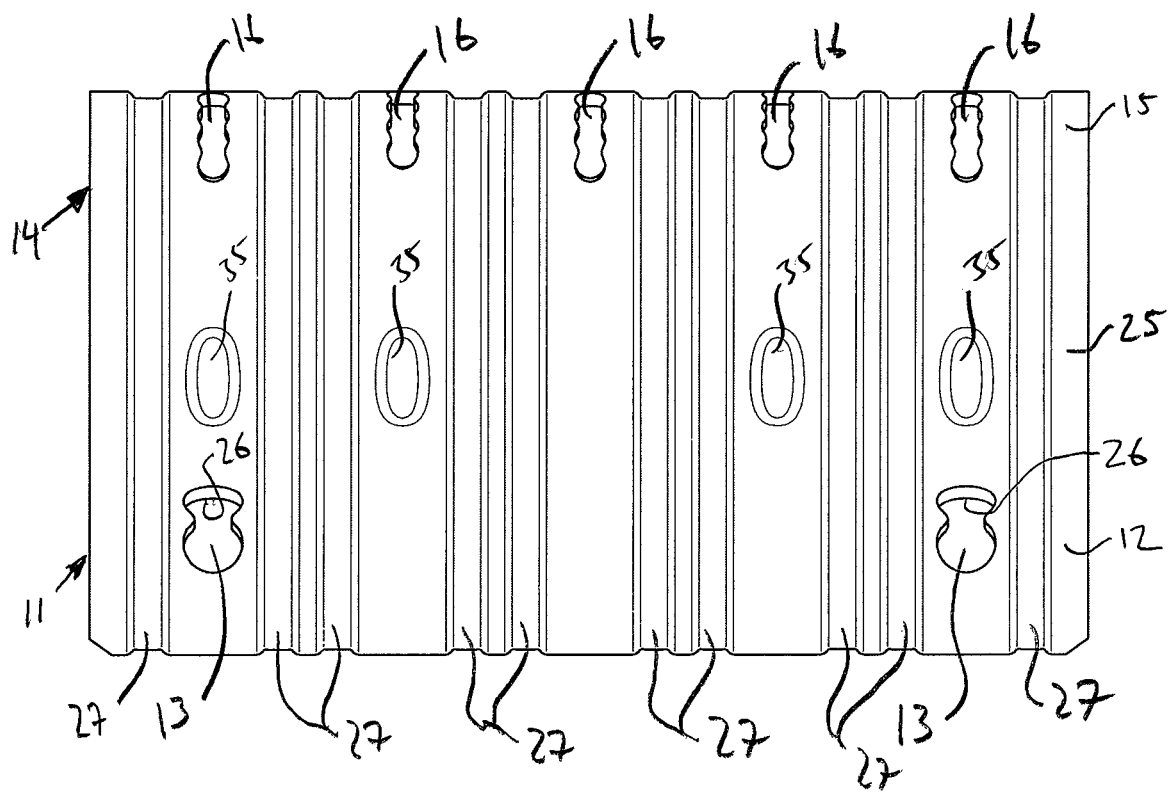
FIG. 4 is a bottom view of the foundation connector of the present invention.
Figure 7:
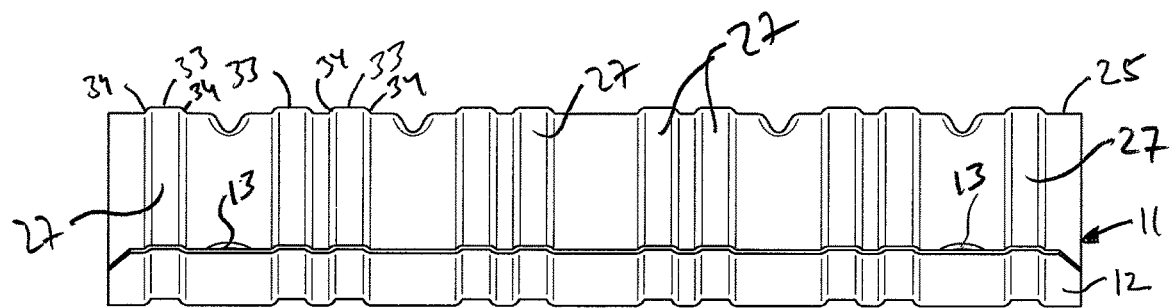
FIG. 7 is a front elevation view of the foundation connector of the present invention.
Figure 8:
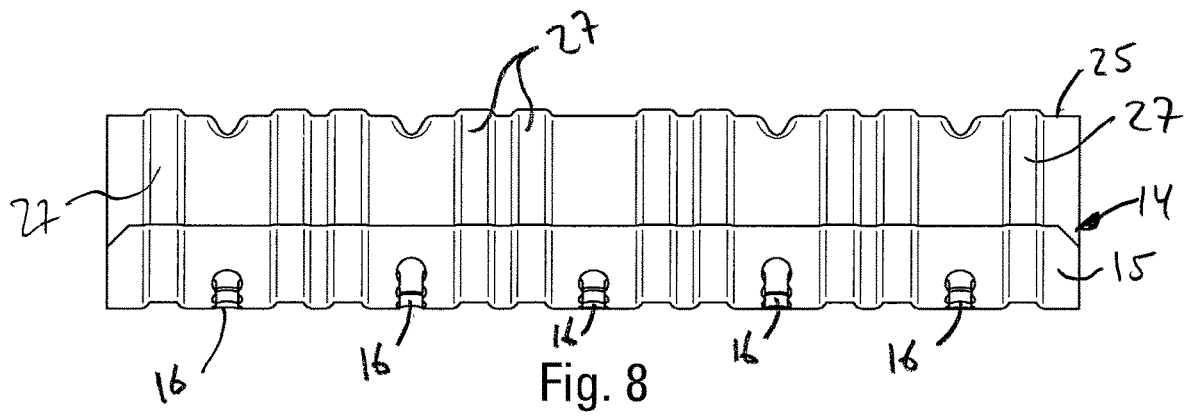
FIG. 8 is a back elevation view of the foundation connector of the present invention.
Figure 9:
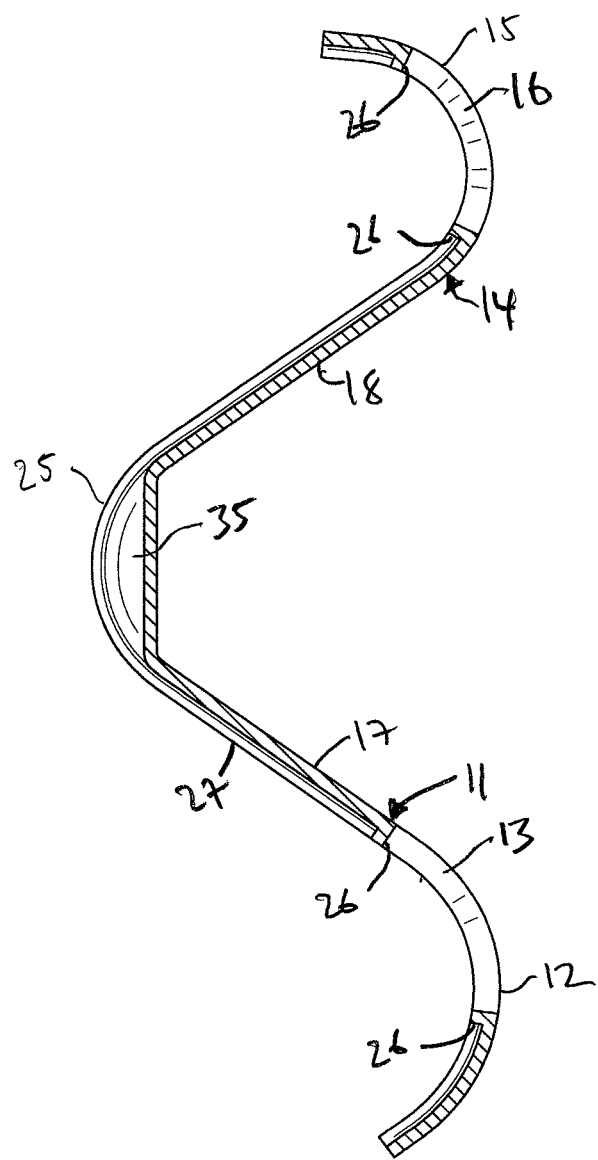
FIG. 9 is a left sectional view of the foundation connector of the present invention taken along the view line shown in FIG. 3.
Figure 10:
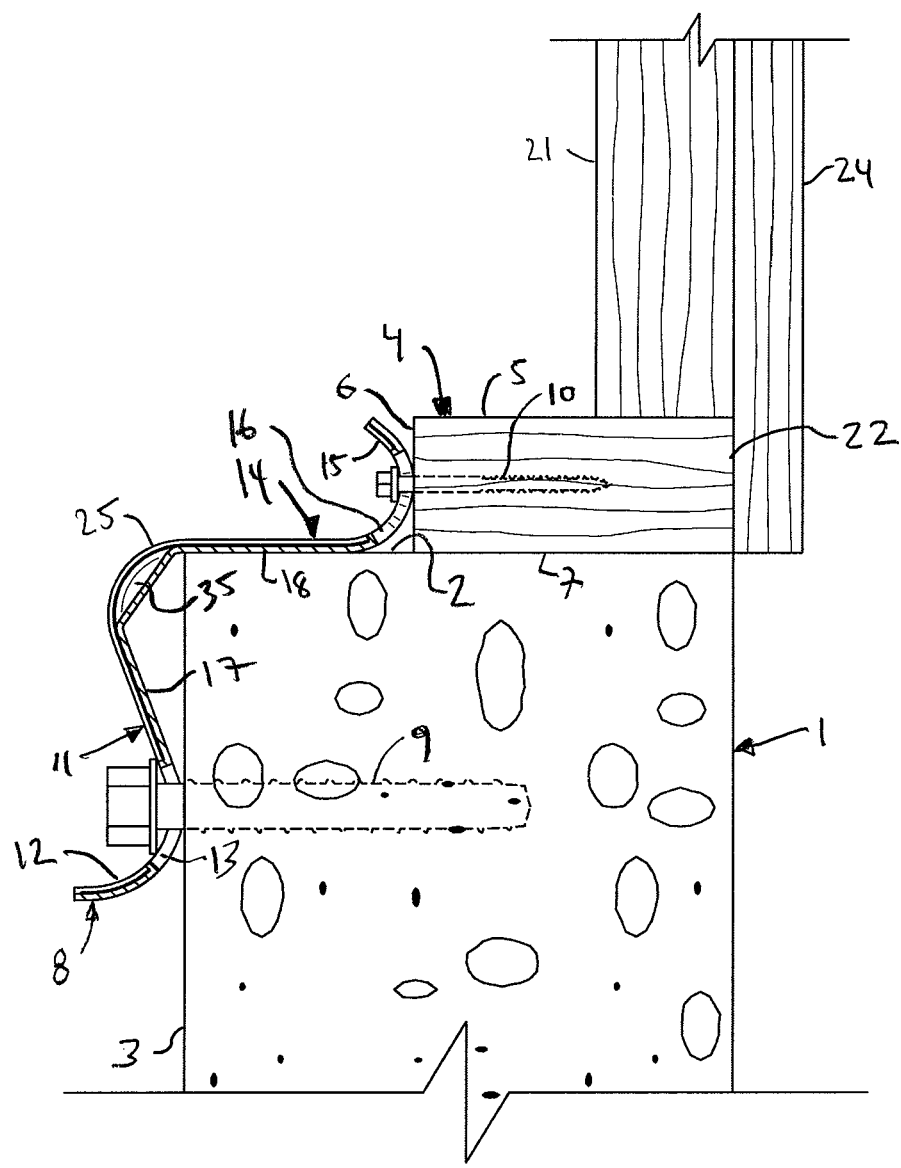
FIG. 10 is a sectional side view of the connection of the present invention. The fastener and anchor are not shown in cross-section.

As shown in FIG. 1, the foundation-to-frame member connection of the present invention includes a foundation 1, having a top surface 2, and a side wall 3, a frame member 4, having an upper surface 5, a side surface 6, and a bottom surface 7, with the frame member 4 being supported by the foundation 1 and a foundation connector 8 connected to the foundation 1 by anchors 9, and connected to the frame member 4 by fasteners 10.

The foundation connector 8 has a foundation attachment section 11 having a foundation attachment base 12 which is formed with one or more openings 13 and which registers with the side wall 3 of the foundation 1. The foundation connector 8 also has a frame attachment section 14 integrally connected to the foundation attachment section 11, the frame attachment section 14 having a frame attachment base 15 which is formed with one or more openings 16 and which is in registration with the side surface 6 of the frame member 4. The one or more anchors 9 are inserted through the one or more openings 13 in the foundation attachment section 11 and anchored in the foundation 1. The one or more fasteners 10 are inserted through the one or more openings 15 in the frame attachment section 14 and anchored in the frame member 4.

As shown in FIGS. 5 and 6, preferably, the foundation attachment base 12 and the frame attachment base 15 are curved. This allows the foundation attachment section 11 to register with the foundation's side surface 3 in many different arrangements between the foundation 1 and the frame member 4. Preferably, the curved foundation attachment base 12 is at the end of the foundation attachment section 11 that is farther from the central portion of the foundation connector 8. Also preferably a straight portion 17 of the foundation attachment section 11 extends from the central portion of the foundation connector 8 to the curved foundation attachment base 12. Similarly, the curved frame attachment base 15 is at the end of the frame attachment section 14 farther from the central portion of the foundation connector 8 and a straight portion 18 of the frame attachment section 14 extends from the central area of the foundation connector 8 to the curved frame attachment base 15.

As shown in FIGS. 5 and 6 the radius of curvature of the curved frame attachment base 15 is smaller than the radius of curvature of the foundation attachment base 12. The fasteners 10 that connect the frame attachment base 15 to the frame member 4 are generally of a smaller diameter than the anchors 9 that attach the foundation attachment base 12 to the foundation 1. Similarly, the surface of the frame member 4 to which the foundation connector 8 shown in FIGS. 5 and 6 is connected is smaller than the surface of the foundation 1 to which the foundation connector 8 is connected. The straight portion 18 of the frame attachment section 14 is preferably slightly longer than the straight portion 17 of the foundation attachment section 11.

As shown in FIG. 1, the connector 8 is shown in a common environment with a floor plate 19 resting on a subfloor 20. Also shown is a rim joist 21 below the subfloor resting on one or more sill plates 22. Wall studs 23 are attached to the floor plate 19 and sheathing 24 is affixed to the wall studs 23.

The foundation attachment base 12 is constructed so that the openings 13 in the foundation attachment base 12 are formed to permit insertion of the anchors 9 at a plurality of angles relative to the foundation connector 8. Similarly, the frame attachment base 15 is constructed so that the openings 16 in the frame attachment base 15 are formed to permit insertion of the fasteners 10 at a plurality of angles relative to the foundation connector 8.

As noted above, preferably, the foundation attachment base 12 and the frame attachment base 15 are curved. Preferably, the foundation attachment section 11 and the frame attachment section 14 are joined by a curved transition section or portion 25 at the central area of the foundation connector 8. As shown in FIGS. 5 and 6, the foundation attachment base 12 and the frame attachment base 15 are concave curved portions, and the transition section 25 is a convex curved portion.

The openings 13 and 16 in the foundation attachment base 12 and the frame attachment base 15 are preferably elongated and formed on the curved foundation attachment base 12 and the curved frame attachment base 15. The openings 13 in the foundation attachment base 12 preferably extend into the straight portion 17 of the foundation attachment section 11. The openings 13 and 16 preferably have elongated, scalloped side walls. The side walls alternately narrow and widen. The edges of the openings 13 and 16 are also preferably formed with upturned lips 26 to strengthen the material of the foundation connector 8 around the openings 13 and 16.

To strengthen the connector 8, the foundation connector 8 is formed with embossments 27 that run along or parallel to the lateral axis 28 between the front and back edges 29 and 30 of the foundation connector 8, and each embossment 27 extends from the front edge 29 to the back edge 30, creating rippled or contoured front and back edges 29 and 30. The embossments 27 are formed so that each embossment runs or extends through at least a portion of the foundation attachment base, through the curved transition section and through at least a portion of the frame attachment base. Preferably the embossments 27 located away from the side edges 31 and 32 of the connector 8 are provided as sideby-side parallel pairs. The embossments 27 are preferably formed with flat top sections 33 and generally flat angled sides 34.

The transition section 25 is preferably strengthened with elongated, oval-shaped indentations 35 between the embossments 27. The indentations 35 project toward the foundation attachment section and frame attachment sections.

Figure 11:
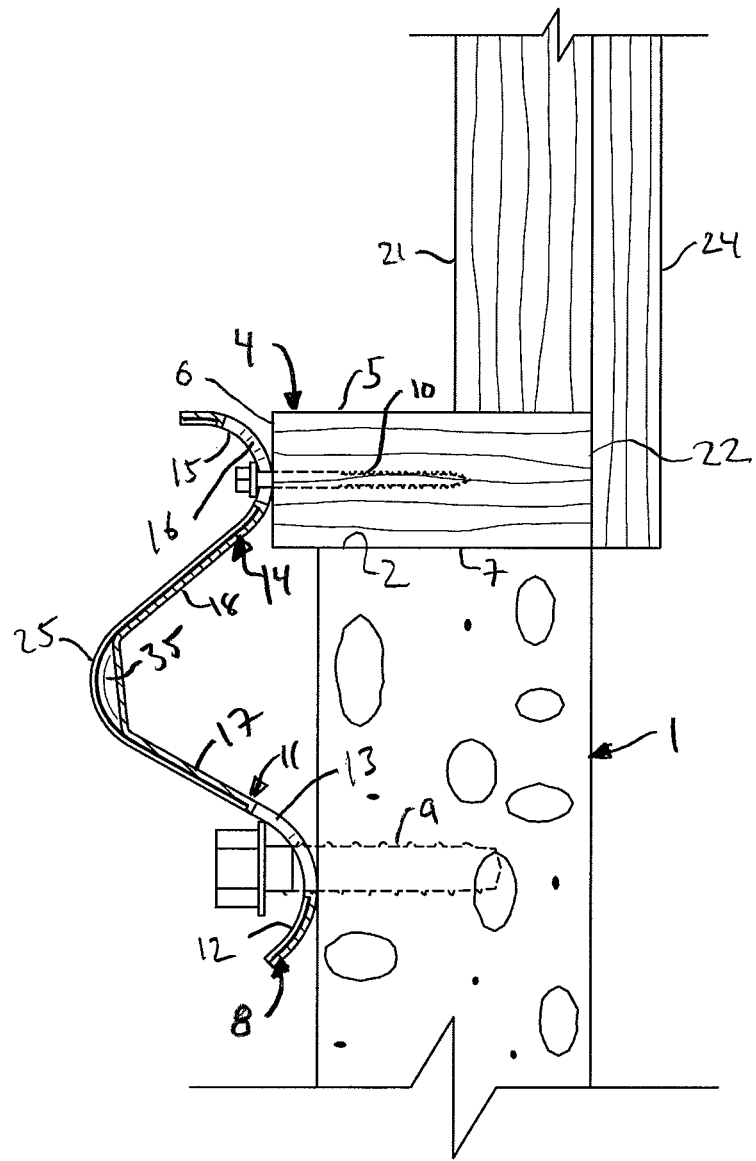
FIG. 11 is a sectional side view of the connection of the present invention, showing the frame member extending beyond the side edge of the foundation.
Figure 12:
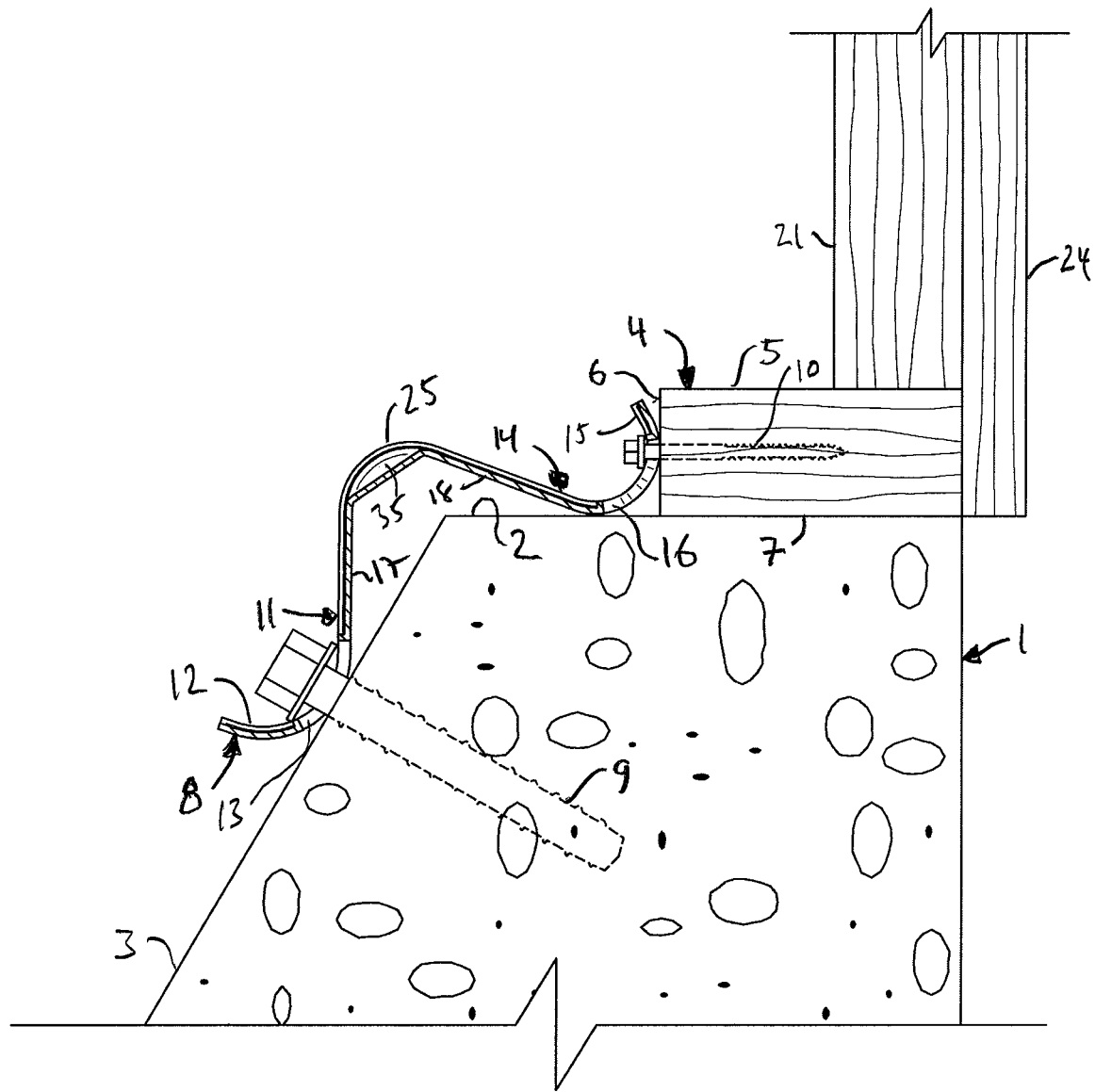
FIG. 12 is a sectional side view of the connection of the present invention, showing the frame member disposed away from the side edge of the foundation.
Figure 13:
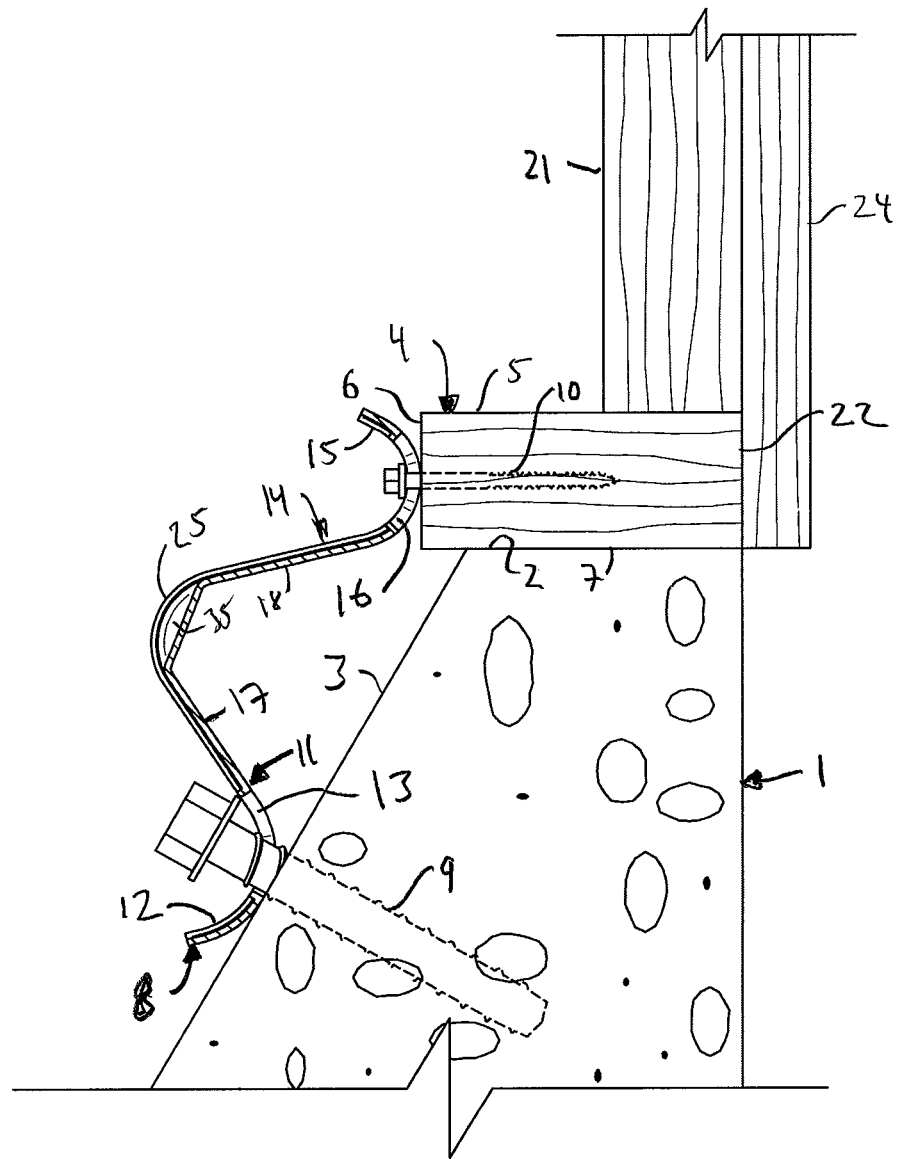
FIG. 13 is a sectional side view of the connection of the present invention, showing the foundation connector mounted on a foundation wall with a sloped surface.

As shown in FIG. 1, the connection may be made with the side surface 6 of the frame member 4 offset from the side wall 3 of the foundation 1. As shown in FIG. 11, the connection may be made with the frame member 4 overhanging the side wall 3 of the foundation 1. As shown in FIG. 12, the connection may be made with a foundation 1 with a sloping side wall 3, rather than a vertically-disposed side wall 3. The frame member 4 may also be aligned with the side wall 3 of the foundation 1.

To make the connection, the installer first decides where the connector 8 is to be located and places the connector 8 on the foundation 1 so that the frame attachment section 14 is in contact with the side surface 6 of the frame member 4 and portions of the edges of the frame attachment openings 16 are in registration with the side surface 6 of the frame member 4 so that fasteners 10, such as screws, may be driven into the frame member 4. Preferably, the fastener openings 16 are located so that the fasteners 10 may be driven into the frame member 4 at about the mid-point of the side surface 6 of the frame member 4 when the frame member 4 is a thin sill member. At the same time, the foundation attachment base 12 should be in contact with the side wall 3 of the foundation 1 with portions of the edges of the foundation attachment openings 13 in registration with the side wall 3 of the foundation 1 so that anchors 9 may connect the foundation attachment base 12 to the foundation 1. The installer then marks the location where the anchors 9 and the fasteners 10 will be driven through the openings 13 and 16 on the foundation 1 and the frame member 4 and removes the connector 8 so that holes may be drilled in the concrete foundation 1. If adhesive anchors 9 are used, the drilled openings are filled with an epoxy or acrylic-based adhesive or some other similarly strong construction adhesive, the anchors 9 are inserted into the openings and the adhesive is given time to harden. When the adhesive is sufficiently cured the connector 8 is placed so that the anchors 9 are inserted through the foundation attachment openings 13 and threaded nuts are loosely threaded on the anchors 9 to hold the connector 8. At this point the frame attachment base 15 should be already in place against the side surface 6 of the frame member 4 and preferably self-drilling fasteners 10 are inserted into the frame member 4 through the connector 8 by a power tool. When the self-drilling fasteners 10 are fully installed, the nuts on the anchors 9 are tightened down. The connection figures show the foundation connector 8 used with anchors 9 that are threaded into the holes in the foundation 1. These anchors 9 provide a strong connection. The installer inserts these anchors 9 through the openings 13 in the foundation attachment base 12 and drives them into the opening where they cut threads into the holes in the foundation 1 to aid in the connection of the connector 8 to the foundation 1. During installation these anchors 9 may be partially inserted, and then later tightly driven into the foundation 1.

We claim:
1. A foundation-to-frame member connection comprising:
a. a foundation, having a top surface, and a side wall;
b. a frame member, having an upper surface, a side surface, and a bottom surface, with the frame member being supported by the foundation,
c. a foundation connector including:
  1. a foundation attachment section having a curved foundation attachment base which is formed with one or more openings and which registers with the side wall of the foundation;
  2. a frame attachment section integrally connected to the foundation attachment section, the frame attachment section having a curved frame attachment base which is formed with one or more openings and which is in registration with the side surface of the frame member;
d. one or more anchors inserted through the one or more openings in the foundation attachment section and anchored in the foundation;
e. one or more fasteners inserted through the one or more openings in the frame attachment section and anchored in the frame member; and
f. the openings in the foundation attachment base and in the frame attachment base have elongated, scalloped side walls, where the side walls alternately narrow and widen.

2. The connection of claim 1, wherein:
a. the foundation attachment base is constructed so that the openings in the foundation attachment base are formed to permit insertion of the anchors at a plurality of angles relative to the foundation connector; and
b. the frame attachment base is constructed so that the openings in the frame attachment base are formed to permit of insertion of the fasteners at a plurality of angles relative to the foundation connector.

3. The connection of claim 1, wherein:
the foundation attachment section and the frame attachment section are joined by a curved transition section at a central area of the foundation connector.

4. The connection of claim 1, wherein:
the foundation attachment base and the frame attachment base are concave curved portions with respect to the transition section which is a convex curved portion with respect to the foundation attachment base and the frame attachment base.

5. The connection of claim 4, wherein:
the openings in the foundation attachment base and the frame attachment base are elongated.

6. The connection of claim 4, wherein:
the openings in the foundation attachment base extend into a straight portion of the foundation attachment section.

7. The connection of claim 4, wherein:
the edges of the openings in the frame attachment base and the foundation attachment base are formed with upturned lips that extend from the frame attachment base and the foundation attachment base.

8. The connection of claim 4, wherein:
the foundation connector is formed with embossments and front and back edges and the embossments run parallel to a lateral axis between the front and back edges of the foundation connector.

9. The connection of claim 8, wherein:
the transition section is provided with elongated, oval-shaped indentations between the embossments.

10. The connection of claim 8, wherein:
at least some of the embossments provided in the foundation connector are formed as side-by-side parallel pairs.

11. The connection of claim 1, wherein:
the openings in the foundation attachment base and the frame attachment base are elongated.

12. The connection of claim 1, wherein:
the openings in the foundation attachment base extend into a straight portion of the foundation attachment section.
13. The connection of claim 1, wherein:
the edges of the openings in the frame attachment base and the foundation attachment base are formed with upturned lips that extend from the frame attachment base and the foundation attachment base.
14. The connection of claim 1, wherein:
the foundation connector is formed with embossments and front and back edges and the embossments run parallel to a lateral axis between the front and back edges of the foundation connector.
15. The connection of claim 14, wherein:
at least some of the embossments provided in the foundation connector are formed as side-by-side parallel pairs.
16. The connection of claim 14, wherein:
the embossments are formed with flat top sections and generally flat angled sides.

\* \* \* \* \*